United States Patent
Shimizu et al.

(10) Patent No.: US 8,228,998 B2
(45) Date of Patent: Jul. 24, 2012

(54) INTRA PREDICTION ENCODING CONTROL METHOD AND APPARATUS, PROGRAM THEREFOR, AND STORAGE MEDIUM WHICH STORES THE PROGRAM

(75) Inventors: Atsushi Shimizu, Yokosuka (JP); Ryuichi Tanida, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 485 days.

(21) Appl. No.: 12/441,665

(22) PCT Filed: Oct. 5, 2007

(86) PCT No.: PCT/JP2007/069620
§ 371 (c)(1),
(2), (4) Date: Mar. 17, 2009

(87) PCT Pub. No.: WO2008/044658
PCT Pub. Date: Apr. 17, 2008

(65) Prior Publication Data
US 2010/0020872 A1 Jan. 28, 2010

(30) Foreign Application Priority Data
Oct. 10, 2006 (JP) ................. 2006-275951

(51) Int. Cl.
*H04N 7/34* (2006.01)
*H04N 7/50* (2006.01)
(52) U.S. Cl. ............... 375/240.24; 375/240.12
(58) Field of Classification Search .......... None
See application file for complete search history.

(56) References Cited

U.S. PATENT DOCUMENTS

| | | | | |
|---|---|---|---|---|
| 5,933,532 | A * | 8/1999 | Mihara | 382/232 |
| 2002/0181583 | A1* | 12/2002 | Corbera | 375/240.03 |
| 2004/0091139 | A1* | 5/2004 | Urushiya | 382/132 |
| 2005/0249277 | A1 | 11/2005 | Ratakonda et al. | |
| 2006/0045186 | A1 | 3/2006 | Koto et al. | |
| 2006/0251330 | A1 | 11/2006 | Toth et al. | |

FOREIGN PATENT DOCUMENTS

| | | |
|---|---|---|
| CN | 1857001 A | 11/2006 |
| EP | 1 610 563 A2 | 12/2005 |
| EP | 1629437 A2 | 3/2006 |

(Continued)

OTHER PUBLICATIONS

G. Wolberg & S. Zokai, "Image Registration for Perspective Deformation Recovery", 4050 Proc. SPIE 259-270 (Apr. 2000).*

(Continued)

*Primary Examiner* — David Czekaj
*Assistant Examiner* — David N Werner
(74) *Attorney, Agent, or Firm* — Harness, Dickey & Pierce, P.L.C.

(57) ABSTRACT

An intra prediction encoding control method used in intra prediction encoding having a plurality of prediction modes and prediction block sizes, wherein the prediction mode and the prediction block size each can be switched when encoding is performed. The method includes a step of computing a flatness degree index which indicates a degree of flatness of a target area for encoding; a step of determining a prediction block size used in intra prediction encoding of the target area, in accordance with the computed flatness degree index; and a step of selecting a prediction mode used in the intra prediction encoding of the target area, for the determined prediction block size.

7 Claims, 10 Drawing Sheets

FOREIGN PATENT DOCUMENTS

| | | |
|---|---|---|
| HU | 2003-1368 A | 2/2005 |
| JP | 2005-244666 A | 9/2005 |
| JP | 2005-348280 | 12/2005 |
| JP | 2006-74474 A1 | 3/2006 |
| JP | 2007-503784 A | 2/2007 |
| KR | 2006-27795 A | 3/2006 |
| NO | 2005-5660 A | 12/2005 |
| RU | 2 128 405 C1 | 3/1999 |
| RU | 2 162 280 C2 | 1/2001 |
| RU | 2 273 112 C2 | 3/2006 |
| WO | WO-2004-104930 A2 | 12/2004 |

OTHER PUBLICATIONS

Lin, Yu-Kun, et al., "Fast Block Type Decision Algorithm for Intra Prediction in H.264 FRExt," 2005 International Conference on Image Processing (ICIP), Sep. 11, 2005, pp. 585-588.

Yang, Chun-Ling, et a., "A Fast H.264 Intra Prediction Algorithm Using Macroblock Properties," 2004 International Conference on Image Processing (ICIP), Oct. 24, 2004, pp. 461-464.

Feng Pan et al., "Fast Mode Decision Algorithm for Intraprediction in H.264/AVC Video Coding," IEEE Trans. Circuits Syst. Video Technol., vol. 15, No. 7, pp. 813-822, Jul. 2005.

Yuichi Tsunematsu et al., "Fast Intra Mode Decision for H.264/AVC FRExt Using Prediction Result Bias," Proceedings of the 2005 IEICE general conference, D-11-5, p. 55, Mar. 2005.

Richardson, Iain E. G., "H.264 and MPEG-4 Video Compression, Video Coding for Next-generation Multimedia," Moscow, Tekhnosphera, 2005, pp. 222-233 (pp. 167-177 of English edition, published Oct. 2003).

* cited by examiner

| TH$_{4-8}$ | TH$_{8-16}$ |
|---|---|
| α α α α | β β β β |

FIG. 4

| QUANTIZATION STEP SIZE RANGE | THRESHOLD | |
| --- | --- | --- |
| | TH$_{4-8}$ | TH$_{8-16}$ |
| a a a a ~ b b b b | A A A A | B B B B |
| b b b b ~ c c c c | C C C C | D D D D |
| ⋮ | ⋮ | ⋮ |

TARGET BLOCK FOR ENCODING AND ALREADY-ENCODED BLOCK a~p     : TARGET 4×4 BLOCK
A~L, O : ALREADY-ENCODED 4×4 BLOCK

FIG. 6B

PREDICTION DIRECTION (EXCEPT FOR DC PREDICTION MODE)

FIG. 7A

TARGET BLOCK FOR ENCODING AND ALREADY-ENCODED BLOCK a~d : TARGET 8×8 BLOCK
A~L, O : ALREADY-ENCODED 4×4 BLOCK

FIG. 7B

PREDICTION DIRECTION (EXCEPT FOR DC PREDICTION MODE)

| BLOCK SIZE | 4×4 DECODING PROCESS | 8×8 DECODING PROCESS |
|---|---|---|
| 4×4 | 15 BLOCKS (240 PIXELS) | — |
| 8×8 | — | 3 BLOCKS (192 PIXELS) |
| 16×16 | — | — |

US 8,228,998 B2

INTRA PREDICTION ENCODING CONTROL METHOD AND APPARATUS, PROGRAM THEREFOR, AND STORAGE MEDIUM WHICH STORES THE PROGRAM

TECHNICAL FIELD

The present invention relates to an intra prediction encoding control method and apparatus used in an intra prediction encoding which has a plurality of prediction modes and a plurality of prediction block sizes so that a mode and a size can be switchably selected, and also relates to an intra prediction encoding control program for implementing the intra prediction encoding control method, and a computer-readable storage medium which stores the program. In particular, the present invention relates to an intra prediction encoding control method and apparatus for reducing the computation cost, an intra prediction encoding control program for implementing the intra prediction encoding control method, and a computer-readable storage medium which stores the program.

Priority is claimed on Japanese Patent Application No. 2006-275951, filed Oct. 10, 2006, the contents of which are incorporated herein by reference.

BACKGROUND ART

In order to improve the encoding efficiency, ITU-T H.264, which is a standard video encoding method (see, for example, Non-Patent Document 1), employs a prediction encoding method in which a predicted signal is generated using peripheral pixels in intra encoding.

In the intra prediction encoding of H.264, the prediction mode or the prediction block size can be adaptively switched. In accordance with such a prediction encoding method, the encoding efficiency of intra encoding has been remarkably improved in comparison with the other known video encoding methods.

FIGS. 6A to 8B show the prediction mode and the prediction block size, employed in H.264.

Figure 6A:
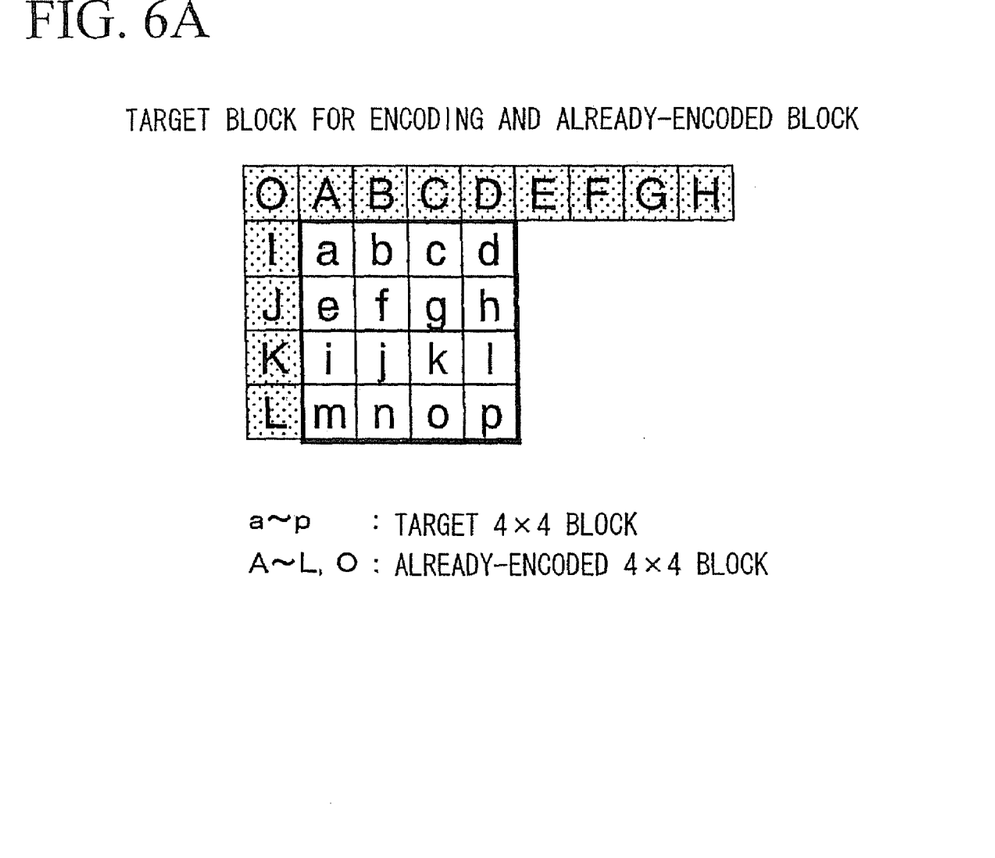
FIG. 6A is a diagram for explaining encoding which uses a prediction block size of 4×4 pixels and is employed in H.264.
Figure 6B:
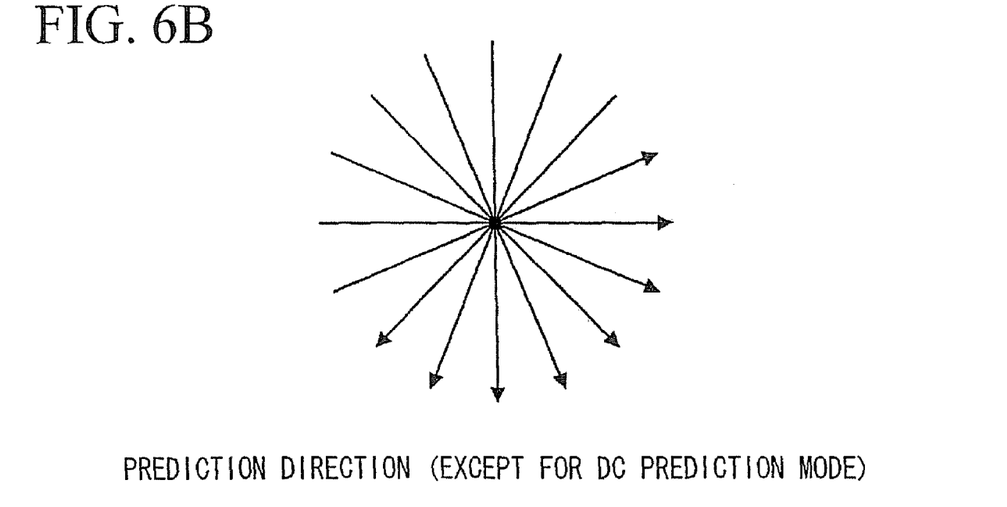
FIG. 6B is a diagram for explaining the prediction direction in FIG. 6A.

FIGS. 6A and 6B relate to an intra prediction encoding of a target macroblock (16×16 pixels) using a prediction block size of 4×4 pixels, where FIG. 6A shows the positional relationship between the target blocks (for encoding) and already-encoded blocks, and FIG. 6B shows the prediction direction.

Figure 7A:
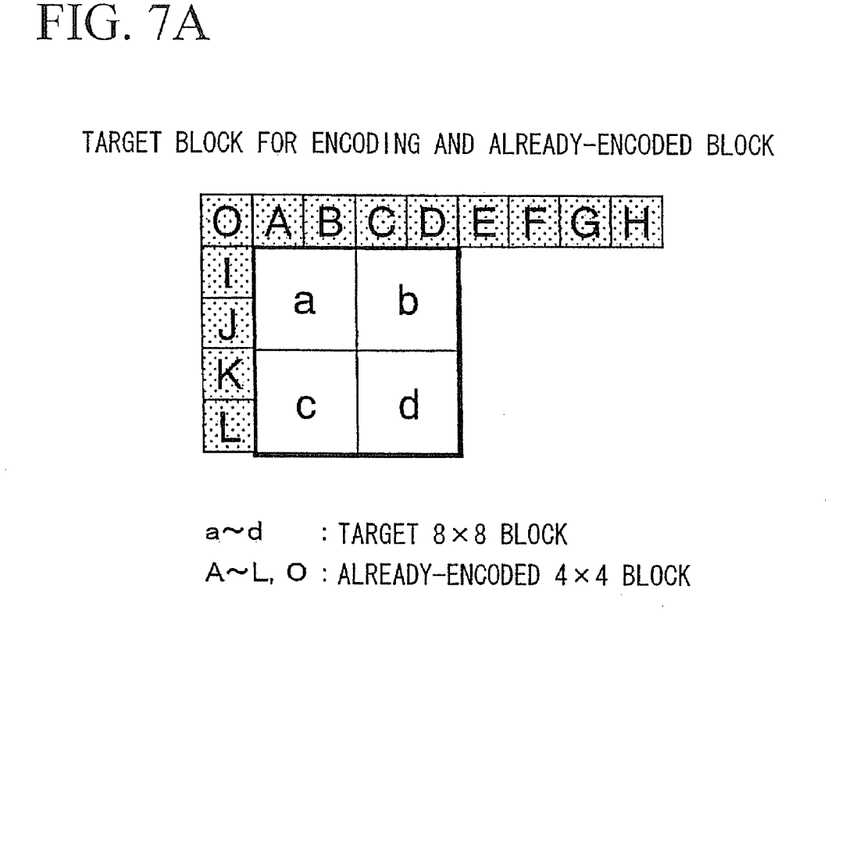
FIG. 7A is a diagram for explaining encoding which uses a prediction block size of 8×8 pixels and is employed in H.264.
Figure 7B:
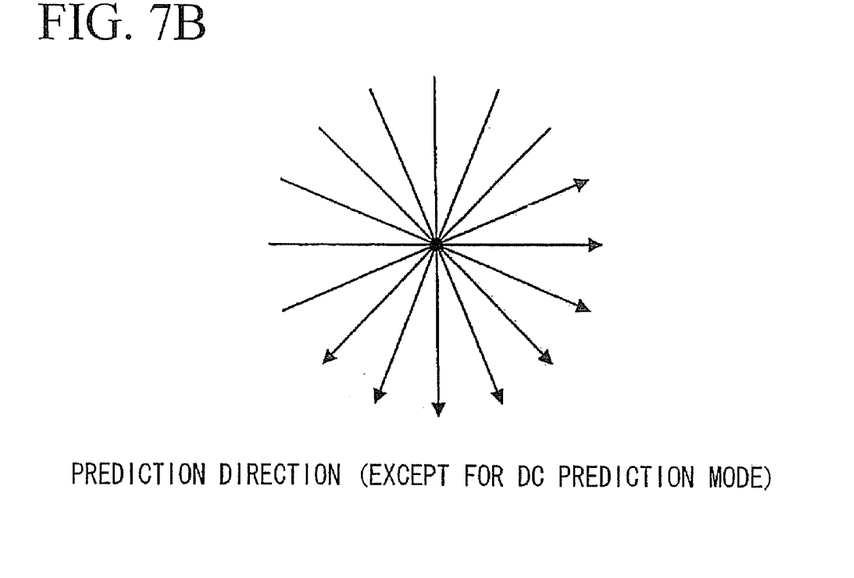
FIG. 7B is a diagram for explaining the prediction direction in FIG. 7A.

Similarly, FIGS. 7A and 7B relate to an intra prediction encoding of a target macroblock using a prediction block size of 8×8 pixels, where FIG. 7A shows the positional relationship between the target blocks (for encoding) and already-encoded blocks, and FIG. 7B shows the prediction direction.

Figure 8A:
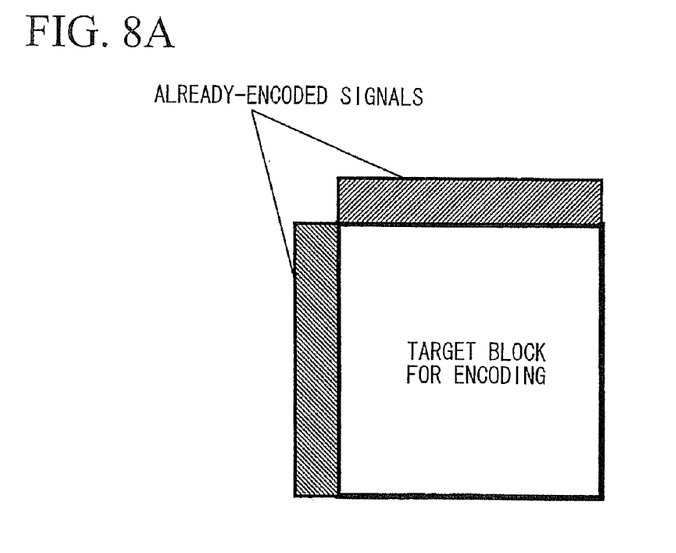
FIG. 8A is a diagram for explaining encoding which uses a prediction block size of 16×16 pixels and is employed in H.264.
Figure 8B:
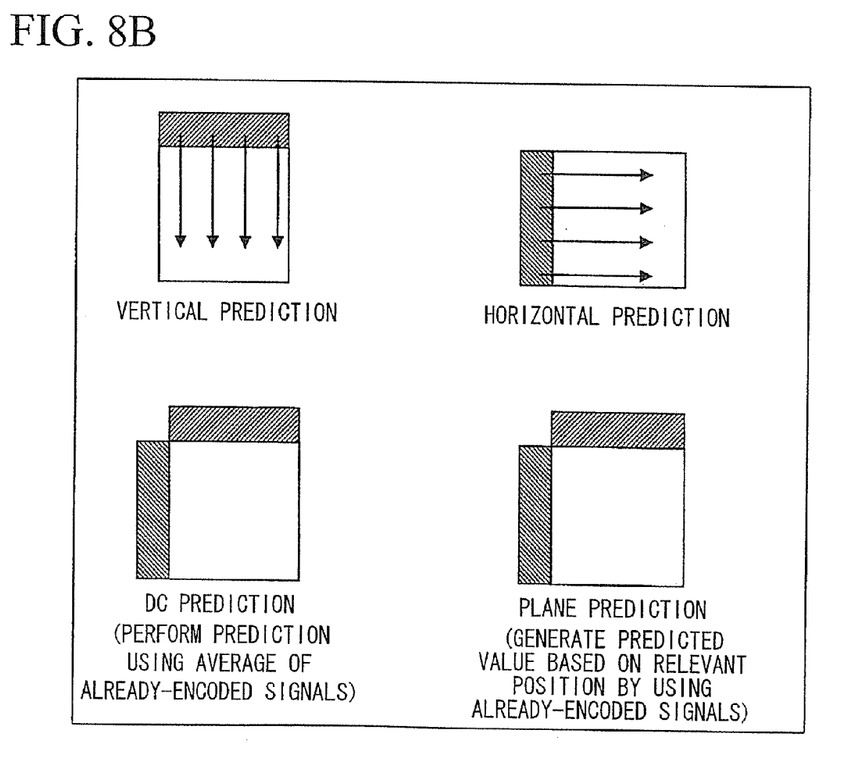
FIG. 8B is a diagram for explaining predictions by means of various directions and methods in FIG. 8A.

Similarly, FIGS. 8A and 8B relate to an intra prediction encoding of a target macroblock using a prediction block size of 16×16 pixels (i.e., the same size as the macroblock), where FIG. 8A shows the positional relationship between the target block (for encoding) and already-encoded signals (or pixels), and FIG. 8B shows predictions by means of various directions and methods.

As described above, in H.264, any prediction block size and any prediction direction can be selected in accordance with the encoding efficiency.

However, although an increase in the number of selectable prediction modes or prediction block sizes improves the encoding efficiency, it increases the cost of computation performed for selecting the prediction mode or prediction block size. Therefore, a method for reducing the computation cost for intra prediction encoding has been proposed.

Figure 9:
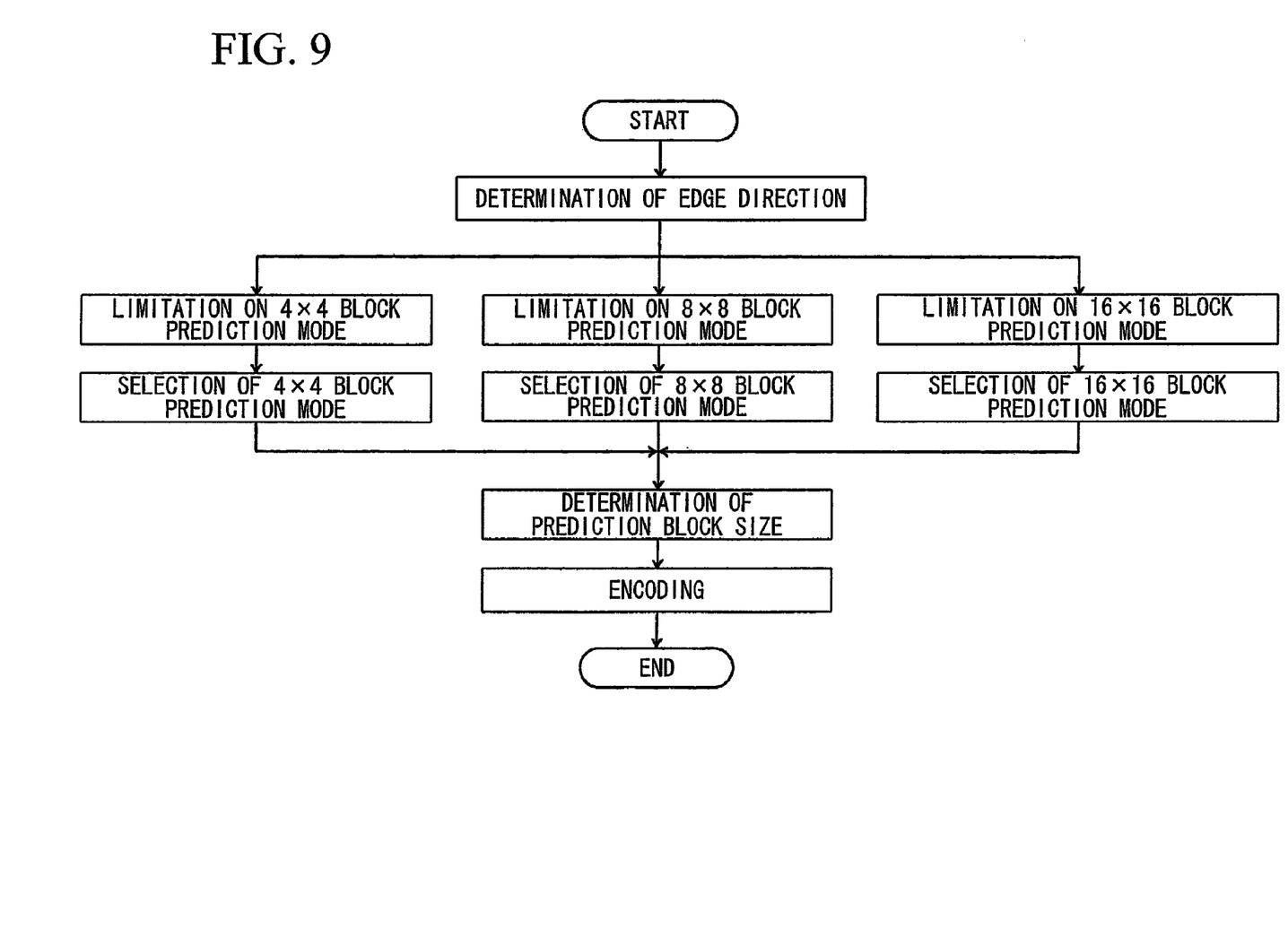
FIG. 9 is a flowchart of the operation executed in the invention disclosed in Non-Patent Document 2.

In the invention disclosed in Non-Patent Document 1, in accordance with the flowchart in FIG. 9, the edge direction is first determined; limited prediction modes are provided; a prediction mode is selected; the prediction block size is determined; and then intra prediction encoding is performed.

In the above-described invention disclosed in Non-Patent Document 1, the edge direction is measured in advance so as to exclude prediction modes having a low probability of being selected, thereby reducing the computation cost.

Figure 10:
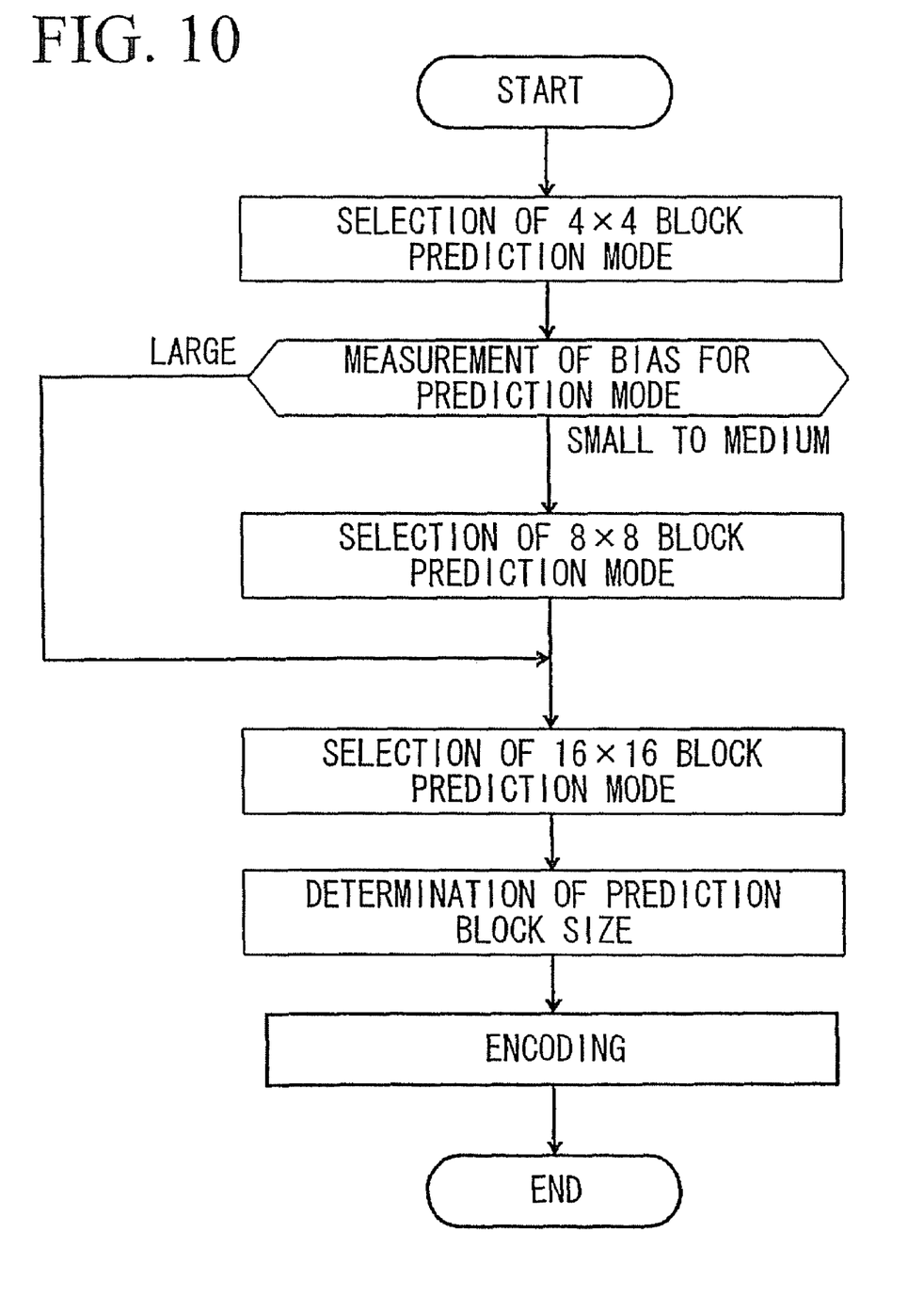
FIG. 10 is a flowchart of the operation executed in the invention disclosed in Non-Patent Document 3.

In the invention disclosed in Non-Patent Document 2, in accordance with the flowchart in FIG. 10, the prediction mode for the 4×4 block size is first selected; a bias for the prediction mode is measured; based on the measurement results, selection of the prediction mode for the 8×8 block size may be skipped, or the prediction mode for the 8×8 block size (if there is no skipping for this size) or 16×16 block size may be performed; the prediction block size is determined; and then intra prediction encoding is performed.

In the above-described invention disclosed in Non-Patent Document 2, the prediction mode for the 4×4 block size (i.e., minimum block size) is first selected, and based on the appearance frequency of the prediction mode for the 4×4 block size, limitation on the 8×8 or 16×16 block size and selection of the prediction block size are controlled.

That is, in the invention disclosed in Non-Patent Document 2, the prediction mode for the 8×8 block size may be limited or the prediction for the 8×8 block size may be skipped in accordance with a bias for the minimum block size, so as to reduce the computation cost.

Additionally, in the invention disclosed in Patent Document 1, frequency data for the prediction mode of peripheral blocks is weighted, and the prediction mode is limited based on the weighted frequency data.

In the invention disclosed in Patent Document 1, the prediction mode and a weighting factor for a reference block are first obtained, and then the priority order of the prediction mode is obtained. Based on the obtained prediction mode and the weighting factor, a weighted histogram for the prediction mode is produced. Then, based on the weighted histogram, a candidate for the prediction mode is selected. In this process, if there is no prediction mode which satisfies a predetermined number used for determining the candidate (as the prediction mode), a prediction mode having a relatively higher priority order is selected, so as to perform intra prediction encoding.

As described above, in the invention disclosed in Patent Document 1, the prediction mode to be used is limited based on statistical data for the prediction mode of peripheral blocks, thereby reducing the number of execution times of a cost computation which is required for selecting the prediction mode.

Non-Patent Document 1: Feng Pan et al., "Fast Mode Decision Algorithm for Intraprediction in H.264/AVC Video Coding," IEEE Trans. Circuits Syst. Video Technol., vol. 15, No. 7, pp. 813-822, July 2005.

Non-Patent Document 2: Yuichi Tsunematsu et al., "Fast Intra Mode Decision for H.264/AVC FRExt Using Prediction Result Bias", Proceedings of the 2005 IEICE general conference, D-11-5, p. 55, March 2005.

Patent Document 1: Japanese Unexamined Patent Application, First Publication No. 2005-348280.

DISCLOSURE OF INVENTION

Problem to be Solved by the Invention

As described above, in the conventional methods, the computation cost is reduced by limiting the prediction mode (to be used) in intra prediction encoding.

For such a function, in the conventional methods, the edge direction of an input signal, a selection result of the prediction mode for the minimum block size, frequency data of the prediction mode for peripheral blocks, or the like are used as data for limiting the prediction mode used in the intra prediction encoding.

However, in such methods, usage of the prediction mode for the 4×4 or 8×8 block size (i.e., smaller than the macroblock size (16×16)) is not limited, or the usage is partially limited.

In order to determine the prediction mode for the 4×4 or 8×8 block size (smaller than the macroblock size), a temporary decoded image should be generated. This is because, for small blocks except for the upper-left small block in each macroblock, a decoded image of each small block adjacent to a target block should be referred to when determining the prediction mode of the target block.

For the generation of a decoded image, orthogonal transformation, quantization, inverse quantization, and inverse orthogonal transformation should be performed. These processes are not actually used for the encoding, but provide temporary decoded results used for selecting the prediction mode. If the relevant block size is not selected, the corresponding temporary decoded results are cancelled.

Figure 11:
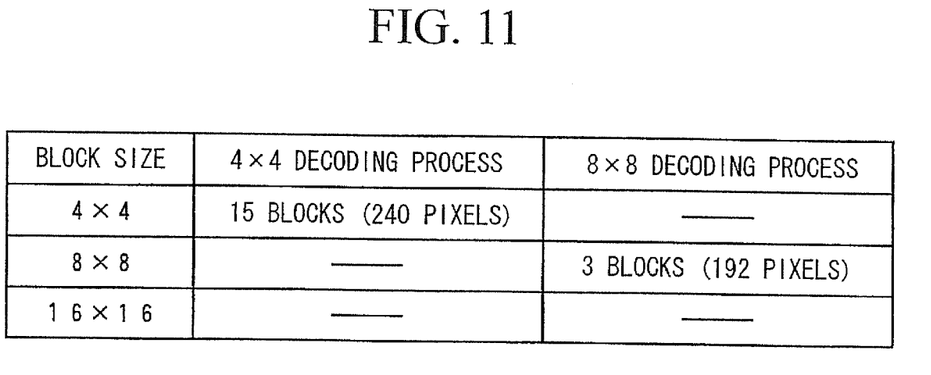
FIG. 11 is a diagram for explaining the amount of decoding processing required for selecting the prediction mode in H.264.

FIG. 11 is a table showing the amount of decoding processing required for selecting the prediction mode for each block size defined in H.264.

As understood by the table, if three block sizes (4×4, 8×8, and 16×16) are used, selection of the prediction mode requires application of a decoding process to 15 blocks (240 pixels) for the 4×4 block size, and 3 blocks (192 pixels) for the 8×8 block size. If a prediction mode for the 16×16 block size is selected last, a decoding process corresponding to approximately 3 macroblocks (which includes the decoding process for a target 16×16 block size block (which is actually decoded)) should be performed.

As described above, in the conventional methods, when selecting the prediction mode, a temporary decoding process should be performed for a prediction block size which may not be selected last.

Therefore, if the 16×16 block size (i.e., macroblock size) is selected last, temporary decoded results for the 4×4 and 8×8 block sizes are cancelled, so that the decoding process applied to at least 432 (i.e., 240+192) pixels is useless.

In light of the above circumstances, an object of the present invention is to provide a novel intra prediction encoding control technique for reducing the computation cost by omitting an unnecessary decoding process in intra prediction encoding.

Means for Solving the Problem

In order to achieve the above-described object, the present invention provides an intra prediction encoding control apparatus used in intra prediction encoding having a plurality of prediction modes and prediction block sizes, wherein the prediction mode and the prediction block size each can be switched when encoding is performed, the apparatus comprising: (1) a computation device for computing a flatness degree index which indicates a degree of flatness of a target area for encoding; (2) a determination device for determining a prediction block size used in intra prediction encoding of the target area, in accordance with the flatness degree index computed by the computation device; and (3) a selection device for selecting a prediction mode used in the intra prediction encoding of the target area, for the prediction block size determined by the determination device.

The above structure may further include (4) a computation device for computing a quantization step size of the target area; and (5) a setting device for setting the threshold based on the quantization step size computed by the computation device.

The intra prediction encoding control method of the present invention, which is implemented when the above devices operate, can also be implemented by a computer program. Such a computer program may be provided by storing it in an appropriate computer-readable storage medium, or by means of a network, and can be installed and operate on a control device such as a CPU so as to implement the present invention.

In the intra prediction encoding control apparatus of the present invention having the above structure, first, the flatness degree index, which indicates the degree of flatness of a target area for encoding, is computed, for example, based on a statistic with respect to the brightness signal in the target area.

In this process, in consideration that a large target area may include a plurality of areas having different flatness degree indexes, the target area may be divided into small areas, and the flatness degree index may be computed for each small area. The flatness degree index of the target area may be computed based on the computed flatness degree indexes.

Then, a prediction block size used in intra prediction encoding of the target area is determined in accordance with the computed flatness degree index. For example, (i) if the degree of flatness of the target area is low, a small prediction block size is determined as the prediction block size for the intra prediction encoding; and (ii) if the degree of flatness of the target area is high, a large prediction block size is determined as the prediction block size for the intra prediction encoding.

Next, in accordance with the determined prediction block size, the prediction mode used in the intra prediction encoding of the target area is selected while regarding the prediction block size as a fixed size.

Therefore, in the intra prediction encoding control apparatus of the present invention, the prediction block size used in the intra prediction encoding of a target area is determined using the flatness degree index, which indicates the degree of flatness of the target area, without performing the determination of the prediction mode.

In the prediction block size determination in the intra prediction encoding control apparatus of the present invention, the prediction block size for the intra prediction encoding may be determined based on a result of a comparison between the computed flatness degree index of the target area and a threshold which is set in accordance with selectable prediction block sizes.

In order to reduce degradation of the encoding efficiency, the above threshold may be set based on the quantization step size of the target area. For example, the threshold may be set in a manner such that when the quantization step size decreases, the probability that a small prediction block size is selected increases.

Also in the setting of the threshold, if the quantization step size of the target area cannot be computed before the prediction block size is determined, then a quantization step size as a substitute for that of the target area may be computed based on an already-computed quantization step size of another area.

Effect of the Invention

In accordance with the present invention, when performing intra prediction encoding, the prediction block size of a target area for encoding can be determined using the flatness degree index, which indicates the degree of flatness of the target area, without performing the determination of the prediction mode.

Therefore, in accordance with the present invention, when performing the intra prediction encoding, it is possible to, not only limit the number of prediction modes for the mode determination, but also omit a temporary decoding process required for determining the prediction mode, which is necessary for each prediction block size. Therefore, the computation cost can be reduced.

REFERENCE SYMBOLS 1 video encoding apparatus
2 intra prediction encoding device
3 prediction block size determination device
4 prediction mode selection device
5 encoding device
6 quantization step size computing unit
30 macroblock division unit
31 L1 dispersion computing unit
32 macroblock flatness degree index computing unit
33 prediction block size determination unit
34 threshold table
35 lookup table
36 table data registration unit
37 threshold setting unit

BEST MODE FOR CARRYING OUT THE INVENTION

Below, the present invention will be explained in detail in accordance with embodiments.

In the present invention, when performing intra prediction encoding, the prediction block size is first limited without limiting the prediction mode (as performed in the conventional methods). When limiting the prediction block size first, it is possible to omit an unnecessary decoding process and thus reduce the computation cost.

Figure 1:
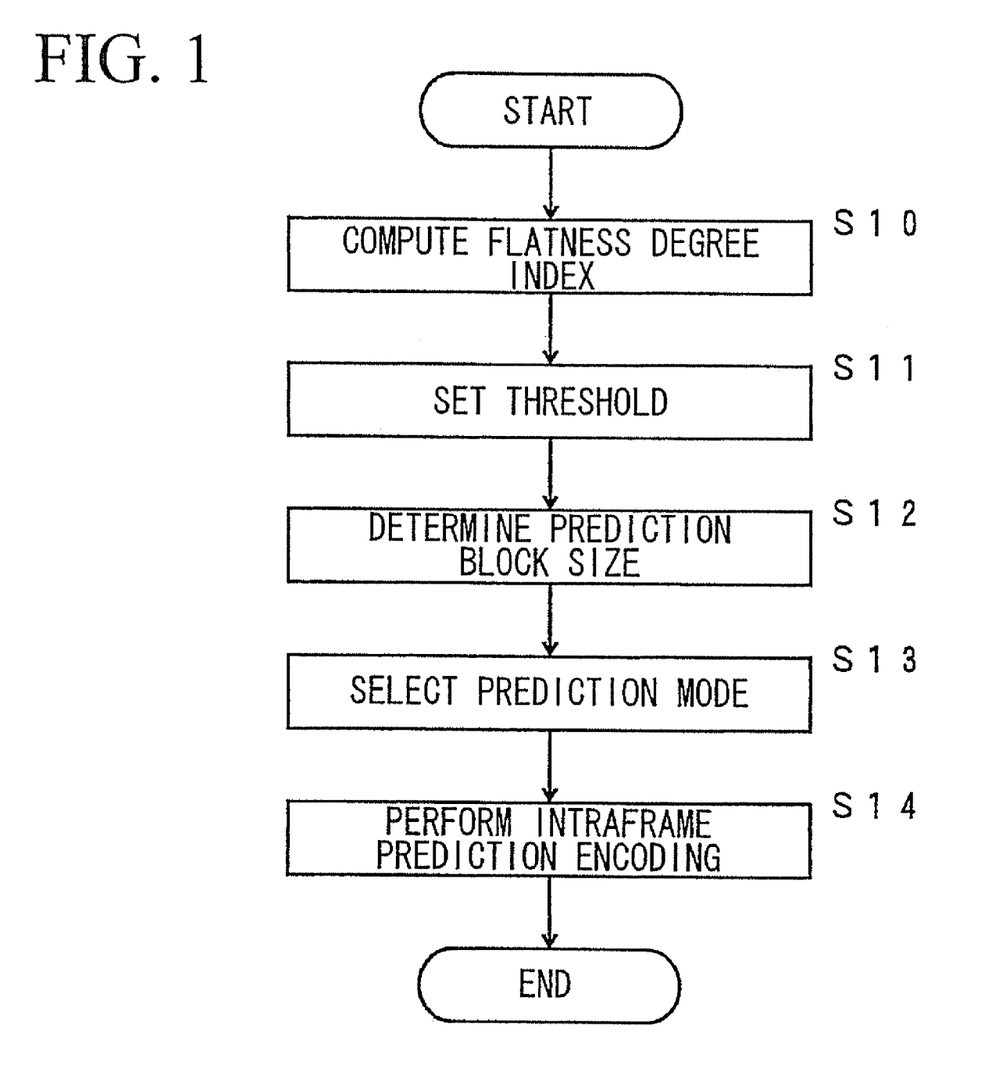
FIG. 1 is a flowchart of the operation executed by a video encoding apparatus in accordance with the present invention.

FIG. 1 is an example of the flowchart executed by a video encoding apparatus in accordance with the present invention. Based on the flowchart, the operation of the video encoding apparatus in accordance with the present invention will be explained.

The video encoding apparatus first computes a flatness degree index which indicates the degree of flatness of a target area for encoding (see step S10).

In the next step S11, a threshold to be compared with the computed flatness degree index is set in accordance with each prediction block size which can be used.

In the next step S12, based on the result of comparison between the computed flatness degree index and the set threshold, the prediction block size for the target area is determined.

In this process of the block size selection for the target area, the lower the degree of flatness, the smaller the selected block size, and the higher the degree of flatness, the larger the selected block size.

In the next step S13, in accordance with the determined prediction block size, the prediction block size is regarded as a fixed size so as to select the prediction mode.

In the last step S14, in accordance with the determined prediction block size and the selected prediction mode, the target area is subjected to intra prediction encoding.

Below, the above operation will be explained in more detail.

In the present invention, the flatness degree index of the target area for encoding is used for first determining the prediction block size employed in the intra prediction encoding of the target area.

The flatness degree index can be computed using a dispersion or an average of relevant pixel values, for example, by using the L2 dispersion (see Formula (1)) or the L1 dispersion (see Formula (2)).

[Formula 1]

$$act = \sum_{i=0}^{N_x} \sum_{j=0}^{N_y} (s(i, j) - <s>)^2 \qquad \text{Formula (1)}$$

$$act = \sum_{i=0}^{N_x} \sum_{j=0}^{N_y} |s(i, j) - <s>| \qquad \text{Formula (2)}$$

In the above formulas, s(i,j) indicates the pixel value at position (i,j) in the target area for encoding, and <s> indicates an average of the relevant pixel values.

As shown by the formulas, the larger the computed flatness degree index, the lower the degree of flatness, and the smaller the computed flatness degree index, the higher the degree of flatness.

If the target area for encoding is large, it may include a plurality of areas having different flatness degree indexes. Therefore, the flatness degree index may be computed after dividing the target area for encoding into small areas. In such a case, the number of computed flatness degree indexes correspond to the number of small areas, and the minimum or maximum value among them is determined as the flatness degree index of the target area for encoding.

For example, a macroblock of the 16×16 block size is divided into small blocks of the 8×8 block size, and the flatness degree index is computed for each small block. Accordingly, four flatness degree indexes are computed for each macroblock, and the minimum or maximum value among them is determined as the flatness degree index of the macroblock.

Such a flatness degree index may be used in another encoding process, for example, for quantization control. If the flatness degree index is commonly used, no computation cost for the intra prediction encoding control should be considered. Therefore, in comparison with the case of computing the edge direction or the like, an additional computation cost may be reduced.

The threshold compared with the flatness degree index is set in accordance with the prediction block size.

For example, if the prediction block size is switched between three sizes such as 4×4, 8×8, and 16×16 in accordance with H.264, two thresholds such as $TH_{4-8}$ used for switching between the 4×4 and 8×8 block sizes and $TH_{8-16}$ used for switching between the 8×8 and 16×16 block sizes ($TH_{4-8} > TH_{8-16}$) are set for performing the relevant switching.

By using the above two thresholds, if the degree of flatness is low as shown by "flatness degree index $\geq TH_{4-8}$", the prediction accuracy is degraded unless a small prediction block size is selected. Therefore, the prediction block size is set to the smallest 4×4 block size.

If the degree of flatness is medium as shown by "$TH_{4-8}$ > flatness degree index $\geq TH_{8-16}$", a medium prediction block size is preferable. Therefore, the prediction block size is set to the 8×8 block size.

If the degree of flatness is high as shown by "$TH_{8-16}$ > flatness degree index", the prediction accuracy is not degraded even when selecting a large prediction block size, and the amount of code can be reduced. Therefore, the prediction block size is set to the largest 16×16 block size.

The threshold value used for the comparison with the flatness degree index may be changed in accordance with the quantization step size.

As each prediction mode has an individual amount of code for overhead data (such as prediction mode data or significant coefficient block data), the relationship between the prediction block size and the flatness degree index varies in accordance with the quantization step size. Therefore, degradation of the encoding efficiency can be reduced by changing the threshold value based on the quantization step size.

In accordance with a knowledge obtained by the inventors of the present application by means of experiments, degradation of the encoding efficiency can be further reduced by setting the threshold in a manner such that when the quantization step size decreases (i.e., fine quantization is performed), the probability that a small prediction block size is selected increases.

That is, if the quantization step size decreases, then for example, the threshold $TH_{4-8}$ is set to a smaller value. Accordingly, the probability of selecting the smallest 4×4 prediction block size increases, thereby reducing the degradation of the encoding efficiency.

For the quantization step size, the value used when quantizing the target area for encoding is preferable. However, if the quantization step size cannot be obtained before the determination of the prediction block size, then the quantization step size of the area which has been encoded immediately before, or an average of the quantization step sizes of the already-processed blocks in the relevant image can be used.

As described above, in accordance with the present invention, when performing the intra prediction encoding, the prediction block size of a target area can be determined using the flatness degree index of the area without performing the determination of the prediction mode.

Therefore, in the intra prediction encoding in accordance with the present invention, the number of prediction modes for the mode determination can be decreased, and a temporary decoding process used for determining the prediction mode for each prediction block size is unnecessary, thereby reducing the computation cost.

Practical Embodiment

Below, the present invention will be explained in detail in accordance with a practical embodiment.

The practical embodiment shown below employs an intra prediction encoding method based on H.264, and uses three block sizes of 16×16, 8×8, and 4×4 for the relevant intra prediction encoding.

Figure 2:
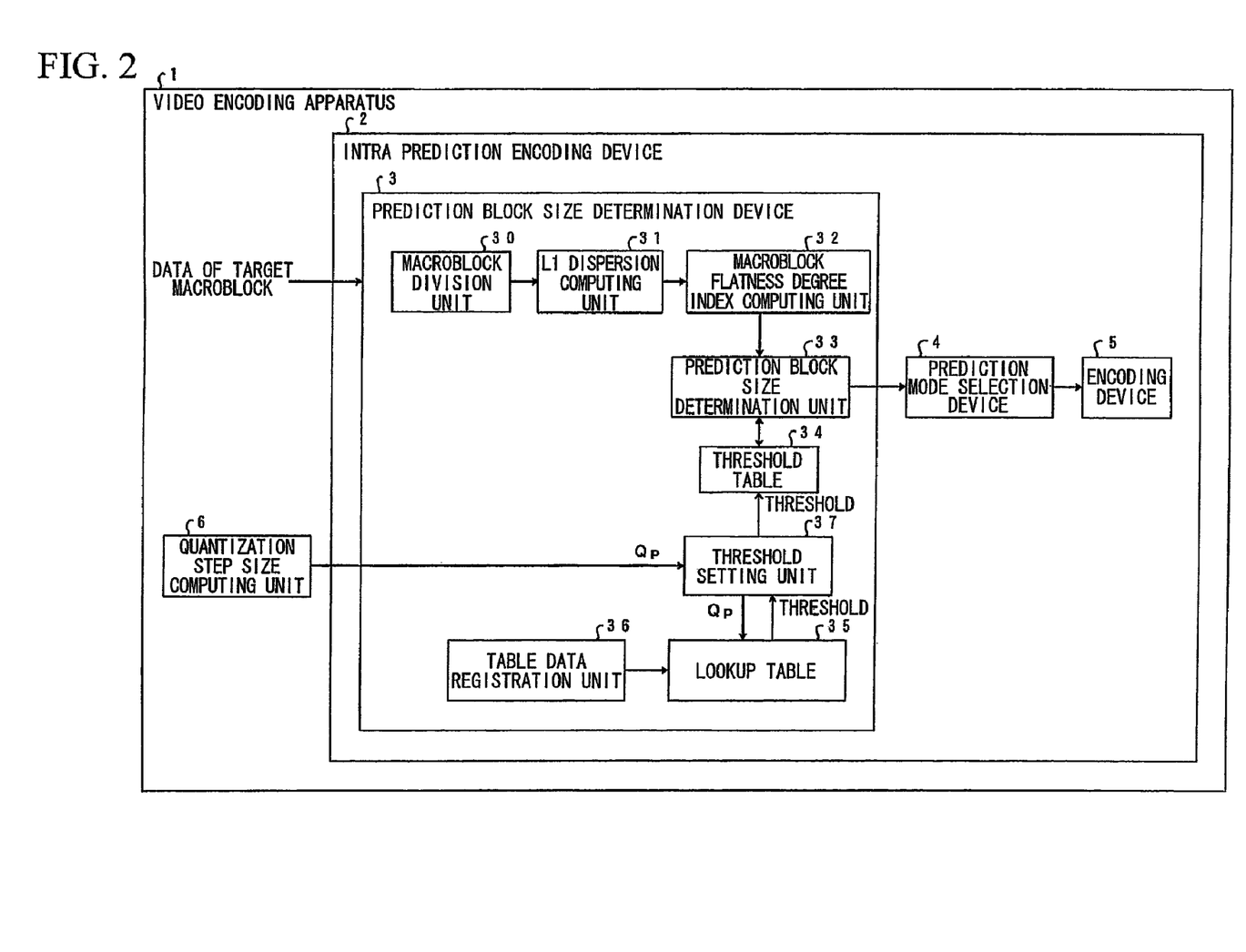
FIG. 2 shows a video encoding apparatus as a practical embodiment of the present invention.

FIG. 2 shows a video encoding apparatus 1 as a practical embodiment of the present invention.

As shown in FIG. 2, the video encoding apparatus 1 has an intra prediction encoding device 2 for performing the intra prediction encoding in accordance with the present invention.

The intra prediction encoding device 2 includes a prediction block size determination device 3 for performing a distinctive process of the present invention so as to determine the prediction block size used in the intra prediction encoding of a target macroblock; a prediction mode selection device 4 for selecting the prediction mode used in the intra prediction encoding of the target macroblock while regarding the prediction block size, which is determined by the prediction block size determination device 3, as a fixed size; and an encoding device 5 for subjecting the target macroblock to the intra prediction encoding based on the prediction block size (determined by the prediction block size determination device 3) and the prediction mode (selected by the prediction mode selection device 4).

In FIG. 2, reference numeral 6 indicates a quantization step size computing unit provided in a quantization control device or the like. The quantization step size computing unit 6 computes the quantization step size of the target macroblock, and communicates the result to the intra prediction encoding device 2.

In order to perform a process of determining the prediction block size used in the intra prediction encoding of the target macroblock, the prediction block size determination device 3 includes a macroblock division unit 30, an L1 dispersion computing unit 31, a macroblock flatness degree index computing unit 32, a prediction block size determination unit 33, a threshold table 34, a lookup table 35, a table data registration unit 36, and a threshold setting unit 37.

The macroblock division unit 30 divides the target macroblock for encoding into four small blocks of the 8×8 block size.

Foe each of the 8×8 small blocks divided by the macroblock division unit 30, the L1 dispersion computing unit 31 computes an L1 dispersion "$act_n$" of the brightness signal in accordance with the following formula (3), where $act_n$ functions as a value (the flatness degree index) which indicates the degree of flatness of the relevant small block.

[Formula 2]

$$act_n = \sum_{i=0}^{7}\sum_{j=0}^{7} |s_y(i,j) - <s_y>|  \quad \text{Formula (3)}$$

In the above formula, $s_y(i,j)$ indicates each pixel value of a small block "n" (n=0 to 3), and $<s_y>$ indicates an average of the brightness signals of the small block "n".

The macroblock flatness degree index computing unit 32 computes the maximum value $act_{max}$ of the four L1 dispersions $act_n$ computed by the L1 dispersion computing unit 31. That is, the following is computed:

$act_{max} = \max(act_0, act_1, act_2, act_3)$

The prediction block size determination unit 33 uses two thresholds $TH_{4-8}$ and $TH_{8-16}$ ($TH_{4-8} > TH_{8-16}$), and performs the determination in a manner such that (i) if a relationship "$act_{max} \geqq TH_{4-8}$" is satisfied, the prediction block size is set to the 4×4 block size; (ii) if a relationship "$TH_{4-8} > act_{max} \geqq TH_{8-16}$" is satisfied, the prediction block size is set to the 8×8 block size; and (iii) if a relationship "$TH_{8-16} > act_{max}$" is satisfied, the prediction block size is set to the 16×16 block size.

Figure 3:
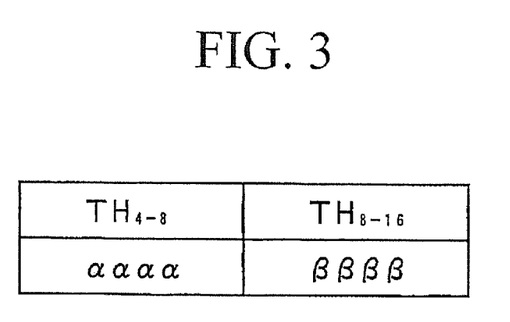
FIG. 3 is a diagram for explaining table data in a threshold table.

As shown in FIG. 3, the threshold table 34 manages the two thresholds $TH_{4-8}$ and $TH_{8-16}$ used by the prediction block size determination unit 33.

Figure 4:
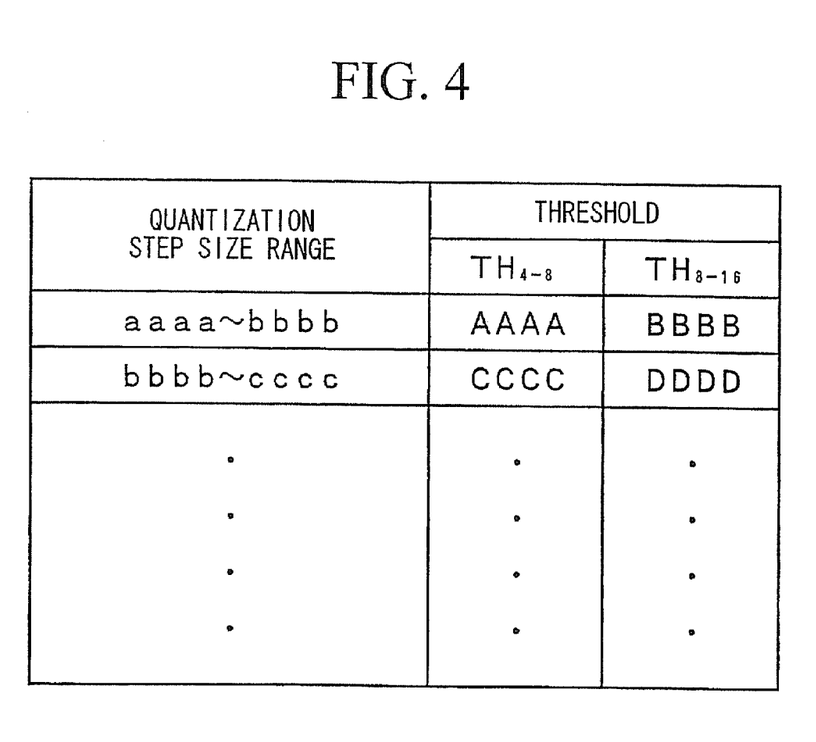
FIG. 4 is a diagram for explaining table data in a lookup table.

As shown in FIG. 4, the lookup table 35 manages the values of the thresholds $TH_{4-8}$ and $TH_{8-16}$, which are assigned to each quantization step size range and used when the quantization step size belongs to the relevant quantization step size range.

The table data registration unit 36 registers data, which indicates corresponding relationships between the quantization step size range and the thresholds $TH_{4-8}$ and $TH_{8-16}$, into the lookup table 35. In accordance with the registered corresponding relationship data, the thresholds are set in a manner such that if the quantization step size decreases, the probability that a relatively small prediction block size is selected increases.

The threshold setting unit 37 refers to the lookup table 35 by using the quantization step size which is computed by the quantization step size computing unit 6 and functions as a key, so as to obtain the values of the thresholds $TH_{4-8}$ and $TH_{8-16}$ suitable for the relevant quantization step size. The threshold setting unit 37 writes the threshold values onto the threshold table 34, so as to set the thresholds $TH_{4-8}$ and $TH_{8-16}$.

Figure 5:
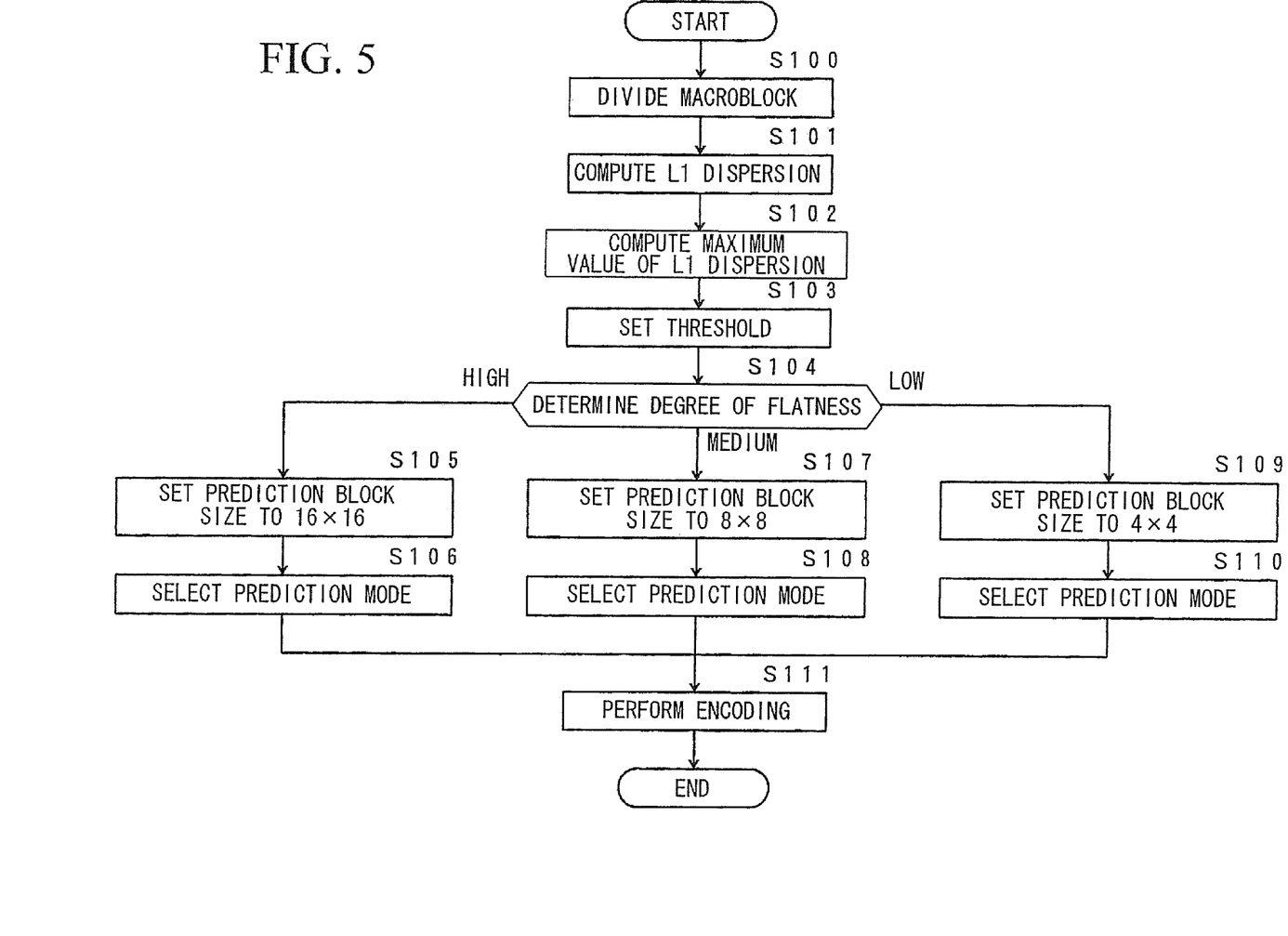
FIG. 5 is a flowchart of the operation executed by an intra prediction encoding device.

FIG. 5 shows an example of the flowchart of the operation executed by the intra prediction encoding device 2 having the above-described structure. In accordance with the flowchart, the operation executed by the intra prediction encoding device 2 will be explained in detail.

As shown in the flowchart of FIG. 5, when data of a target macroblock for encoding is provided to the intra prediction encoding device 2, the intra prediction encoding device 2 first divides the target macroblock (16×16 block size) into four small blocks (8×8 block size) (see step S100).

In the next step S101, for each of the four divided small blocks, the L1 dispersions $act_0$, $act_1$, $act_2$, and $act_3$ of the brightness signal are computed in accordance with the above-described formula (3).

In the next step S102, the maximum value $act_{max}$ among the four computed L1 dispersions $act_0$, $act_1$, $act_2$, and $act_3$ is computed as follows:

$act_{max} = \max(act_0, act_1, act_2, act_3)$

The computed $act_{max}$ is determined as the flatness degree index which indicates the degree of flatness of the target macroblock.

In the next step S103, the thresholds $TH_{4-8}$ and $TH_{8-16}$ used for determining the prediction block size are set.

More specifically, in the threshold setting process, the lookup table 35 is referred to by using the quantization step size (as a key) of the target macroblock, which is computed by the quantization step size computing unit 6, so as to obtain the values of the thresholds $TH_{4-8}$ and $TH_{8-16}$ suitable for the quantization step size, and to write the values onto the threshold table 34.

In the next step S104, the maximum value $act_{max}$ of the L1 dispersion, which has been computed as the flatness degree index of the target macroblock, is compared with the two thresholds $TH_{4-8}$ and $TH_{8-16}$ read from the threshold table 34, so as to determine the degree of flatness of the target macroblock.

More specifically, in the determination process, (i) if the relationship "$act_{max} \geqq TH_{4-8}$" is satisfied, it is determined that the degree of flatness is low; (ii) if the relationship "$TH_{4-8} > act_{max} \geqq TH_{8-16}$" is satisfied, it is determined that the degree of flatness is medium; and (iii) if the relationship "$TH_{8-16} > act_{max}$" is satisfied, it is determined that the degree of flatness is high.

In accordance with the determination process in step S104, if it is determined that the degree of flatness of the target macroblock is high, the operation proceeds to step S105, and the 16×16 block size is determined as the prediction block size. In the following step S106, the prediction mode of the target macroblock is selected for the determined prediction block.

Also in accordance with the determination process in step S104, if it is determined that the degree of flatness of the target macroblock is medium, the operation proceeds to step S107, and the 8×8 block size is determined as the prediction block size. In the following step S108, the prediction mode of the target macroblock is selected for the determined prediction block.

Also in accordance with the determination process in step S104, if it is determined that the degree of flatness of the target macroblock is low, the operation proceeds to step S109, and the 4×4 block size is determined as the prediction block size. In the following step S110, the prediction mode of the target macroblock is selected for the determined prediction block.

Therefore, in accordance with the process from step S105 to S110, the prediction block size and the prediction mode of the target macroblock for encoding are selected, and in the following step S111, the target macroblock is subjected to the intra prediction encoding by using the prediction block size and the prediction mode.

Accordingly, in the present invention, when performing intra prediction encoding, the prediction block size used for the encoding can be determined before determining the prediction mode.

In the above-described practical embodiment, no limitation is imposed on the prediction mode for each prediction block size. However, the number of prediction modes which can be used may be limited so as to further reduce the computation cost.

INDUSTRIAL APPLICABILITY

The present invention can be applied to intra prediction encoding, and it is possible to, not only limit the number of prediction modes for the mode determination, but also omit a temporary decoding process required for determining the prediction mode, which is necessary for each prediction block size. Therefore, the computation cost can be reduced.

The invention claimed is:

1. An intra prediction encoding control method used in intra prediction encoding having a plurality of prediction modes and prediction block sizes, wherein the prediction mode and the prediction block size each can be switched when encoding is performed, the method comprising:
a step of computing a flatness degree index which indicates a degree of flatness of a target area for encoding, by using Formula (1) or (2):

$$act = \sum_{i=0}^{N_x} \sum_{j=0}^{N_y} (s(i,j) - \langle s \rangle)^2 \quad \text{Formula (1)}$$

$$act = \sum_{i=0}^{N_x} \sum_{j=0}^{N_y} |s(i,j) - \langle s \rangle| \quad \text{Formula (2)}$$

where s(i,j) indicates the pixel value at position (i,j) in the target area for encoding, and <s> indicates an average of the relevant pixel values;
a step of determining a prediction block size used in intra prediction encoding of the target area, in accordance with the computed flatness degree index; and
a step of selecting a prediction mode used in the intra prediction encoding of the target area, for the determined prediction block size,
wherein in the intra prediction encoding, a predicted signal is generated using peripheral pixels; and
in the step of determining the prediction block size:
one or more thresholds having different values are set in accordance with selectable prediction block size so as to set a plurality of level ranges for the flatness degree index, and
different block sizes are assigned to the level ranges in a manner such that the higher the degree of flatness of the target area, the larger the determined prediction block size for the encoding.

2. The intra prediction encoding control method in accordance with claim 1, further comprising:
a step of computing a quantization step size of the target area; and
a step of setting one or more thresholds based on the computed quantization step size.

3. The intra prediction encoding control method in accordance with claim 2, wherein in the step of computing the quantization step size, if the quantization step size cannot be computed before the step of determining the prediction block size is executed, then the quantization step size of the target area is computed based on an already-computed quantization step size of another area.

4. The intra prediction encoding control method in accordance with claim 1, wherein in the step of computing the flatness degree index, the flatness degree index is computed based on a statistic for brightness signals in the target area.

5. The intra prediction encoding control method in accordance with claim 1, wherein in the step of computing the flatness degree index, the target area is divided into a plurality of areas, the flatness degree index is computed for each divided area; and the flatness degree index of the target area is computed based on the flatness degree indexes of the divided areas.

6. An intra prediction encoding control apparatus used in intra prediction encoding having a plurality of prediction modes and prediction block sizes, wherein the prediction mode and the prediction block size each can be switched when encoding is performed, the apparatus comprising:
a computation device for computing a flatness degree index which indicates a degree of flatness of a target area for encoding, by using Formula (1) or (2):

$$act = \sum_{i=0}^{N_x} \sum_{j=0}^{N_y} (s(i,j) - \langle s \rangle)^2 \quad \text{Formula (1)}$$

$$act = \sum_{i=0}^{N_x} \sum_{j=0}^{N_y} |s(i,j) - \langle s \rangle| \quad \text{Formula (2)}$$

where s(i,j) indicates the pixel value at position (i,j) in the target area for encoding, and <s> indicates an average of the relevant pixel values;
a determination device for determining a prediction block size used in intra prediction encoding of the target area, in accordance with the flatness degree index computed by the computation device; and
a selection device for selecting a prediction mode used in the intra prediction encoding of the target area, for the prediction block size determined by the determination device,
wherein in the intra prediction encoding, a predicted signal is generated using peripheral pixels; and
the determination device:
sets one or more thresholds having different values in accordance with selectable prediction block size so as to set a plurality of level ranges for the flatness degree index, and
assigns different block sizes to the level ranges in a manner such that the higher the degree of flatness of the target area, the larger the determined prediction block size for the encoding.

7. A computer-readable storage medium which stores an intra prediction encoding control program by which a computer executes a process for implementing the image encoding control method comprising the steps of:
computing a flatness degree index which indicates a degree of flatness of a target area for encoding, by using Formula (1) or (2):

$$act = \sum_{i=0}^{N_x} \sum_{j=0}^{N_y} (s(i,j) - \langle s \rangle)^2 \quad \text{Formula (1)}$$

$$act = \sum_{i=0}^{N_x} \sum_{j=0}^{N_y} |s(i,j) - \langle s \rangle| \quad \text{Formula (2)}$$

where s(i,j) indicates the pixel value at position (i,j) in the target area for encoding, and <s> indicates an average of the relevant pixel values;
determining a prediction block size used in intra prediction encoding of the target area, in accordance with the computed flatness degree index and based on one or more thresholds having different values that are set in accordance with selectable prediction block size so as to set a plurality of level ranges for the flatness degree index, and wherein different block sizes are assigned to the level ranges in a manner such that the higher the degree of flatness of the target area, the larger the determined prediction block size for the encoding; and selecting a prediction mode used in the intra prediction encoding of the target area, for the determined prediction block size, wherein in the intra prediction encoding, a predicted signal is generated using peripheral pixels.

* * * * *